(12) United States Patent
Nyu

(10) Patent No.: US 6,636,526 B1
(45) Date of Patent: Oct. 21, 2003

(54) SIGNAL SENDING-AND-RECEIVING CIRCUIT AND SELF ID PROCESS FOR NODE-TO-NODE COMMUNICATIONS IN SERIAL-BUS NETWORK

(75) Inventor: Takayuki Nyu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/329,304

(22) Filed: Jun. 10, 1999

(30) Foreign Application Priority Data

Jun. 19, 1998 (JP) .......................................... 10-172343

(51) Int. Cl.$^7$ ............................................. H04L 12/40
(52) U.S. Cl. ....................................... 370/445; 370/447
(58) Field of Search ................................ 370/433, 445, 370/447, 451, 454, 455, 461, 462, 366; 709/221, 222, 250, 253; 710/8

(56) References Cited

U.S. PATENT DOCUMENTS

| | | | | |
|---|---|---|---|---|
| 4,596,012 A | * | 6/1986 | Reed | |
| 4,755,990 A | * | 7/1988 | Bohler | |
| 5,535,212 A | * | 7/1996 | Koopman | |
| 5,544,332 A | * | 8/1996 | Chen | |
| 5,630,173 A | | 5/1997 | Oprescu | |
| 5,745,697 A | * | 4/1998 | Charny et al. | |
| 5,933,613 A | * | 8/1999 | Tanaka et al. | |
| 5,968,128 A | * | 10/1999 | Lauck et al. | 709/232 |
| 6,330,245 B1 | * | 12/2001 | Brewer | 370/424 |
| 6,381,445 B1 | * | 4/2002 | Ue et al. | 455/69 |

FOREIGN PATENT DOCUMENTS

| | | |
|---|---|---|
| EP | 0 903 900 A2 | 3/1999 |
| JP | 8-293879 | 11/1996 |
| JP | 9-269199 | 10/1997 |
| JP | 10-271144 A | 10/1998 |
| JP | 10-303949 A | 11/1998 |
| JP | 11-98160 | 4/1999 |
| JP | 11-98160 A | 4/1999 |

OTHER PUBLICATIONS

1998 Denshi Jyouhou Tsuushin Gakkai Sougou Taikai B–7–165 [ 1998 Electro–Communication Conference Synthesis Competition B–7–165].
"IEEE Standard for a High Performance Serial Bus," IEEE Std. 1394–1995, pp. 34–35, pp. 98–113.
"High Performance Serial Bus (Supplement)," P139b Draft 0.10, pp. 81–112 (1997).

* cited by examiner

Primary Examiner—Kenneth Vanderpuye
(74) Attorney, Agent, or Firm—Foley & Lardner

(57) ABSTRACT

A signal sending-and-receiving circuit is used for a long-distance port in a node having a state machine within a serial-bus network, wherein a sending section performs scrambling, coding and conversion on signals given from the state machine to produce serial signals which are sent onto a transmission path, while a receiving section performs conversion, de-scrambling and decoding on signals given from the transmission path to produce decoded signals. A control signal is created based on a Data_prefix signal detected from the signals of the state machine, and an Idle signal or a Grant signal detected from the decoded signals. The control signal controls a selector to selectively output either the decoded signals or a pseudo Idle signal which is newly created. Then, a collision signal is created in response to an output of the selector. Thus, it is possible to avoid collision between a grant signal and a Self ID packet, so it is possible to prevent the Self ID packet from being damaged. In addition, the state machine is designed to have six states, namely, S0 (Self ID Start), S1 (Self ID Grant), S2 (Self ID Receive), S3 (Send Speed Capabilities), S4 (Self ID Transmit) and S5 (Self ID Suspend). Herein, the state machine is placed in the state S5 to suspend the Self ID process until the node detects Idle at a parent port connected to a parent node after detecting Idle at a receive port receiving the Self ID packet from another node.

14 Claims, 12 Drawing Sheets

SIGNAL SENDING-AND-RECEIVING CIRCUIT AND SELF ID PROCESS FOR NODE-TO-NODE COMMUNICATIONS IN SERIAL-BUS NETWORK

BACKGROUND OF THE INVENTION

1. Field of the Invention

This invention generally relates to node-to-node communications performed in serial-bus networks using serial buses, which connect personal computers (or PCs) and electronic apparatuses together. Specifically, this invention relates to signal sending-and-receiving circuits applicable to long-distance ports of nodes of the serial-bus networks and Self ID processes for initialization of the serial-bus networks in the node-to-node communications. Herein, the serial-bus networks are designed based on an architecture using a specific kind of serial bus or equivalence of such serial bus, which is standardized by "IEEE Std. 1394-1995" (i.e., IEEE Standard for a High Performance Serial Bus, where "IEEE" is an abbreviation for "Institute of Electrical and Electronics Engineers"), for example.

This application is based on Patent Application No. Hei 10-172343 filed in Japan, the content of which is incorporated herein by reference.

2. Description of the Related Art

Engineers have proposed networks using serial buses in transmission of control signals and main signals between peripheral devices (e.g., hard disk units and scanners) and/or electronic devices. Herein, the electronic devices contain terminal devices facilitating serial buses, which will be called "nodes".

For example, the paper of Japanese Patent Application, Publication No. Hei 8-293879 discloses the technology related to the electronic devices such as the personal computers and digital television receivers which are connected with P1394 serial buses, wherein operation mode control is performed to avoid hang-up at a bus reset mode.

The aforementioned nodes have various kinds of state machines, functions of which can be mainly classified into four types. Namely, there are provided three processes for initialization of networks (i.e., Bus Reset process, Tree ID process and Self ID process) as well as a process (i.e., Normal process) which performs "normal" communications between nodes.

Each of the processes defines multiple states. For example, the Bus Reset process defines two states, i.e., "R0" (Reset Start) and "R1" (Reset Wait).

In addition, the Tree ID process defines four states, i.e., "T0" (Tree ID Start), "T1" (Child Handshake), "T2" (Parent Handshake) and "T3" (Root Contention).

Further, the Self ID process defines five states, i.e., "S0" (Self ID Start), "S1" (Self ID Grant), "S2" (Self ID Receive), "S3" (Send Speed Capabilities), "S4" (Self ID Transmit). Furthermore, the Normal process defines seven states, i.e., "A0" (Idle), "A1" (Request Test), "A2" (Request Delay), "A3" (Request), "A4" (Grant), "A5" (Receive) and "A6" (Transmit).

The state machine performs state transition in response to a signal (or signals) given from an adjoining node connected thereto. Next, a description will be given with respect to node-to-node communications, which cause transition of states of the state machine.

It is possible to construct a network by using a serial bus, which uses two pairs of STPs (i.e., Shielded Twisted Pairs) within a prescribed range of node-to-node distances up to 4.5 m, for example. FIG. 7 shows an example of node-to-node communication effected between two nodes, i.e., "Node 1" and "Node 2", which are connected together by two pairs of "twisted wire pairs" (referred to as "TPA" and "TPB" respectively). Specifically, FIG. 7 shows contents of signals communicated between the nodes over a cable. Herein, TPA and TPB cross with each other. In FIG. 7, TPA at Node 1 corresponds to TPB at Node 2, while TPB at Node 1 corresponds to TPA at Node 2. In an initial state, both of Node 1 and Node 2 output Idle signals, where (TPA, TPB)=(Z,Z). Table 1 shows a result of collision effected between "Parent_notify" signal (0,Z) output from Node 1 and an output (Z,Z) of Node 2. That is, Table 1 indicates that as the result of the collision, Node 2 receives a state (Z,0) on the cable. Incidentally, "send signal" of Node 1 in Table 1 represents a signal which is observed from Node 2. Table 2 shows a result of collision effected between "Parent_notify" signal (0,Z) output from Node 1 and "Child_notify" signal (Z,1) output from Node 2. That is, Table 2 indicates that as the result of the collision, Node 1 receives a state (0,1) on the cable. Incidentally, "send signal" of Node 2 in Table 2 represents a signal which is observed from Node 1. As described above, half duplex communication is performed between the nodes of the serial-bus network using the twisted wire pairs.

Next, a description will be given with respect to operations of nodes in accordance with a Self ID process with reference to a network architecture shown in FIG. 8. Herein, there provided four nodes, namely, Node 1, Node 2, Node 3 and Node 4, wherein both of Node 2 and Node 3 function as repeaters, each of which is configured using only a physical (link) layer (or PHY layer) consisting of a state machine and ports. Node 1 and Node 4 have other layers up to application layers in addition to the PHY layers. Incidentally, this invention exclusively relates to improvements in the PHY layers. Therefore, a description is omitted with regard to the other layers such as LINK layers, transaction layers and application layers. In the PHY layer, the DS port effects DS modulation (where "DS" is an abbreviation for "Data Strobe") on signals given from the state machine, so that modulated signals are output on the twisted wire pairs TPA and TPB. In addition, the DS port demodulates signals given from the twisted wire pairs, so that demodulated signals are transferred to the state machine.

FIG. 9 shows an example of transition of states in the state machine in accordance with the conventional Self ID process. Herein, "S0" designates an initial state of the Self ID process. Upon receipt of a grant signal, the state machine performs a state transition from the state S0 to a state "S1". Herein, the state S1 is a state that the state machine sends or receives the grant signal. Under a condition of "all_child_port_identified=true" where the state machine receives signals declaring ends of the Self ID processes from all ports linked to child nodes, the state machine performs a state transition from the state S1 to a state S4. On the other hand, if the state machine receives a Data_prefix signal from a port linked to the child node, it performs a state transition from the state S1 to a state "S2". Herein, the state S2 is a state that the state machine receives a Self ID packet. When the state machine ends reception of the packet and detects an Idle signal on a receive port, it performs state transition from the state S2 to the state S0. The state S4 is a state that the state machine sends the Self ID packet. So, when the state machine ends the Self ID process at completion in sending of the Self ID packet, it performs a state transition from the state S4 to a state A0 which corresponds to the Normal process. Incidentally, a description will be omitted with regard to a state S3 and its transition conditions, which are not directly related to the present invention.

Next, a description will be given with respect to operations of the Self ID process under an assumption that Node 1 serves as a root designating a central node of the network with reference to FIG. 10, which also shows transition of states of the state machine in Node 3. Each of Nodes 2, 3 and 4 receives a grant signal (grant 1) from the root (i.e., Node 1). Upon receipt of the grant signal, each of them sends a Self ID packet representing information thereof. At first, Node 1 sends "grant 1", so that Nodes 2 and 3 repeat (or relays) it. Upon receipt of grant 1, Node 3 performs a state transition from S0 to S1, so that it successively sends the grant signal (grant 1) to Node 4. Upon receipt of the grant 1, Node 4 sends a Self ID packet 1 to follow a Data_prefix signal representing a head portion of the packet. When receiving the Data_prefix signal from Node 4, Node 3 performs a state transition from S1 to S2, so that it stops repeating the grant 1. In addition, Node 3 sends an Idle signal to Node 4 while simultaneously repeating the Self ID packet 1, given from Node 4, with respect to Node 2. At the timing to complete reception of the Self ID packet 1 from Node 4, the state machine of Node 3 performs a state transition from S2 to S0. Similarly, Node 2 receiving a Data_prefix signal from Node 3 stops sending the grant 1. In addition, Node 2 sends an Idle signal to Node 3 while simultaneously repeating the Self ID packet 1 with respect to Node 1. Then, at completion in reception of the Self ID packet 1 from Node 2, Node 1 sends a next grant signal (grant 2) to Node 2 and Node 3. Upon receipt of the grant 2, Node 3 performs a state transition from S0 to S1. At this time, Node 4 which serves as a child node for Node 3 completes a Self ID process thereof So, Node 3 performs a state transition from S1 to S4. In addition, Node 3 sends a Self ID packet 2 following a Data_prefix signal to Node 2 and Node 4. Thereafter, procedures similar to the aforementioned procedures in the node-to-node communications will be repeated. Then, when all of the nodes complete sending of the Self ID packets thereof, the network ends the Self ID processes.

Meanwhile, it is possible to construct a network shown in FIG. 11 by changing the coding method and transmission paths, by which it is possible to actualize communications using a relatively long node-to-node distance which may exceed 4.5 m, for example. Herein, reference is made to "P1394b Draft 0.10". In FIG. 11, each of Node 2 and Node 3 uses a long-distance port, details of which is shown in FIG. 12. Functions of the long-distance port are mainly classified into two sections, i.e., a sending section and a receiving section. Herein, the sending section of the long-distance port is configured by a sending encoder for performing transmission-path coding and scrambling on signals given from the state machine, a parallel-to-serial converter for converting parallel signals to serial signals, and a transmitter whose operation depends on a transmission medium (or transmission path) to be used. The receiving section of the long-distance port is configured by a receiver whose operation depends on the transmission medium, a serial-to-parallel converter for converting serial signals to parallel signals, a receiving decoder for performing decoding and de-scrambling on transmission-path codes, and a collision signal creation circuit for creating signals to activate a state machine of a high-order layer based on send signals given from the state machine and receive signals given from the transmission path. Such a configuration of FIG. 12 is taught by the paper of Japanese Patent Application No. Hei 9-269199, for example. As for the long-distance port, the transmission path for the sending section is provided independently of the transmission path for the receiving section. Therefore, it is possible to perform full duplex communications.

In some case, however, there is a possibility that the Self ID packets representing information of nodes are destructed or damaged in the network architecture whose node-to-node distance exceeds 4.5 m as shown in FIG. 11. In that case, there is a problem that initialization of the network is not completed normally.

Now, a description will be given with respect to damage of the Self ID packet with reference to FIG. 13. In FIG. 13, Node 1 corresponding to a root node sends a grant signal (grant 1). So, Nodes 2 and 3 repeat the grant 1. Thus, Node 3 performs a state transition from S0 to S1. In response to the grant 1, Node 4 sends a Self ID packet "1" to follow a Data_prefix signal representing a head portion of the packet. Node 3 receives the Data_prefix signal so as to cause a state transition from Si to S2. Thus, Node 3 stops repeating the grant 1 with respect to Node 4. In addition, Node 3 outputs an Idle signal (Idle 2) while simultaneously repeating the Self ID packet 1, given from Node 4, with respect to Node 2. At completion of reception of the Self ID packet 1 from Node 4, Node 3 performs a state transition from S2 to S0. When receiving the Data_prefix signal from Node 3, Node 2 stops repeating the grant 1. In addition, Node 2 outputs an Idle signal (Idle 3) to Node 3 while simultaneously repeating the Self Id packet 1, given from Node 3, with respect to Node 1. At completion of reception of the Self ID packet 1 from Node 2, Node 1 sends a next grant signal (grant 2) to Node 2. If a distance between Nodes 2 and 3 is relatively long, there is a possibility that the Idle 3 given from Node 2 does not reach Node 3 at completion of transmission of the Self ID packet 1 which is sent from Node 3 to Node 2. In such a case, the state machine of Node 3 mistakenly recognizes the grant 1 given from Node 2 as the grant signal which is issued for itself. Thus, Node 3 mistakenly performs a state transition from S0 to S1. Then, Node 3 performs a state transition from S1 to S4 because Node 4 ends the Self ID process thereof. As a result, Node 3 starts sending a Self ID packet 2. Thus, a collision occurs between the grant 2 and the Self ID packet 2 within communication effected between Nodes 1 and 2. So, the Self ID packet 2 should be damaged.

SUMMARY OF THE INVENTION

It is an object of the invention to provide a signal sending-and-receiving circuit that is capable of preventing Self ID packets (describing information of nodes) from being damaged in a serial-bus network whose node-to-node distance exceeds 4.5 m, for example.

It is another object of the invention to provide a Self ID process for the serial-bus network using the signal sending-and-receiving circuit, by which it is possible to complete initialization of the serial-bus network normally.

A signal sending-and-receiving circuit is applicable to a long-distance port (for a node-to-node distance of over 4.5 m) employed in a node having a state machine within a serial-bus network. Herein, the signal sending-and-receiving circuit is basically configured by a sending section and a receiving section. The sending section performs scrambling, coding and conversion on signals given from the state machine to produce serial signals, which are sent onto a transmission path. The receiving section performs conversion, de-scrambling and decoding on the serial signals given from the transmission path to produce decoded signals. In addition, a control signal is created based on a Data_prefix signal which is detected from the signals of the state machine, and an Idle signal or a Grant signal which is detected from the decoded signals. The control signal controls a selector to selectively output either the decoded signals or a pseudo Idle signal which is newly created. Then, a collision signal is created in response to an output of the selector. Thus, it is possible to avoid collision between a grant signal and a Self ID packet, so it is possible to prevent the Self ID packet from being damaged.

The state machine is designed to have fix states, namely, S0 (Self ID Start), S1 (Self ID Grant), S2 (Self ID Receive), S3 (Send Speed Capabilities), S4 (Self ID Transmit) and S5 (Self ID Suspend). Herein, the state machine is placed in the state S5 to suspend the Self ID process until the node detects Idle at a parent port connected to a parent node after detecting Idle at a receive port receiving the Self ID packet from another node.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

Figure 1:
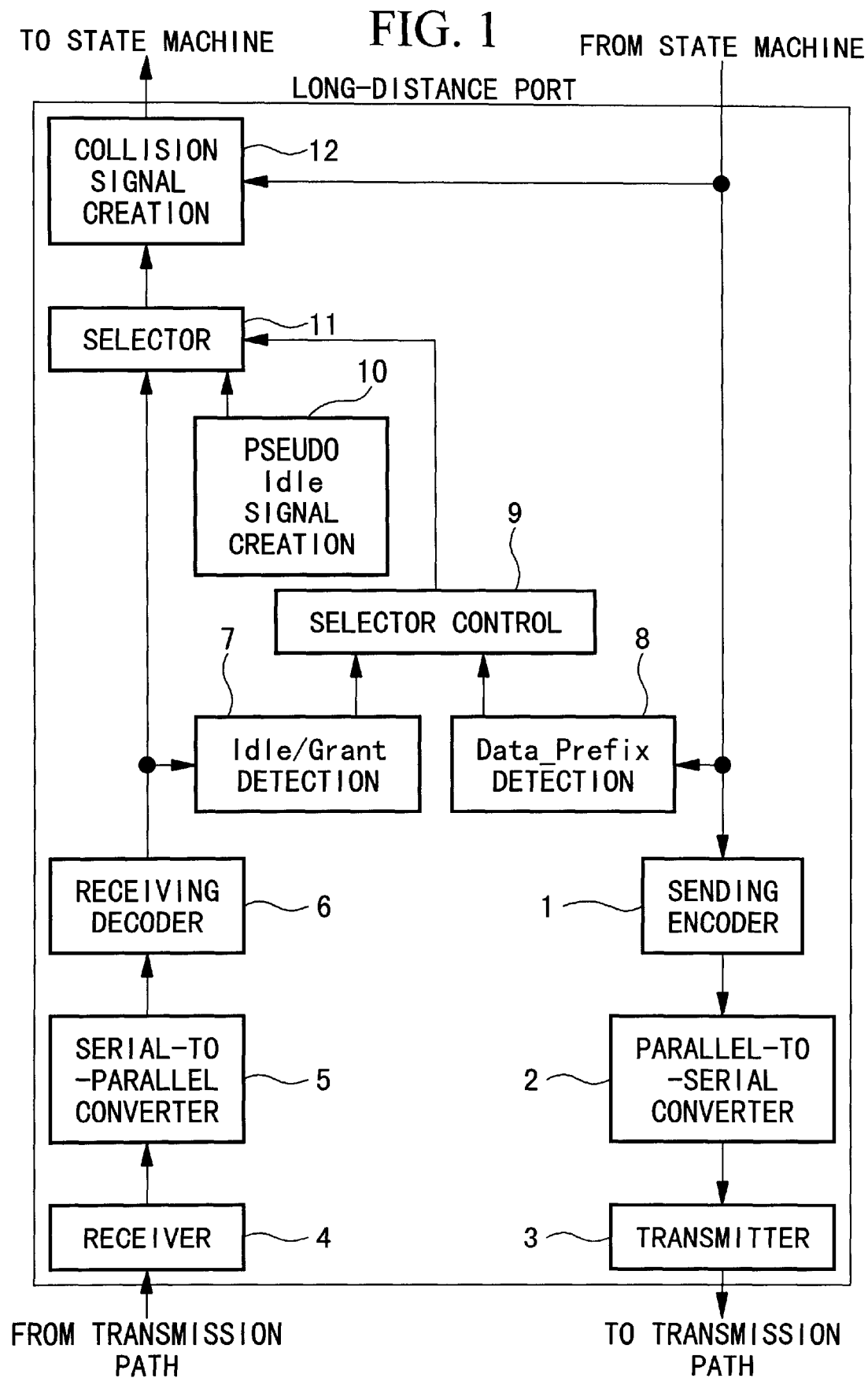
FIG. 1 is a block diagram showing an example of a configuration of a signal sending-and-receiving circuit applicable to a serial-bus network whose node-to-node distance is relatively long in accordance with embodiment of the invention.

FIG. 1 is a block diagram showing a signal sending-and-receiving circuit applicable to a serial-bus network whose node-to-node distance is relatively long in accordance with the preferred embodiment of the invention.

The signal sending-and-receiving circuit of FIG. 1 is configured by a sending encoder 1, a parallel-to-serial converter 2, a transmitter 3, a receiver 4, a serial-to-parallel converter 5, a receiving decoder 6, an Idle/Grant detection circuit 7, a Data_Prefix detection circuit 8, a selector control circuit 9, a pseudo Idle signal creation circuit 10, a selector 11 and a collision signal creation circuit 12.

The sending encoder 1 has functions by which signals given from the state machine are subjected to transmission-path coding and scrambling to produce parallel signals. The parallel-to-serial converter 2 converts the parallel signals given from the sending encoder 1 to serial signals. The transmitter 3 converts the serial signals given from the parallel-to-serial converter 2 to signals of a prescribed form which depends on characteristics of a transmission medium (or transmission path) to be used. Then, the receiver 4 receives the signals depending on the transmission medium so as to convert them to signals which depend on characteristics of the serial-to-parallel converter 5 to follow. In other words, the receiver 4 converts the signals to serial signals. Then, the serial-to-parallel converter 5 converts the serial signals to parallel signals. The receiving decoder 6 performs decoding and de-scrambling on the parallel signals given from the serial-to-parallel converter 5. The Idle/Grant detection circuit 7 detects Idle signals or Grant signals from outputs of the receiving decoder 6. Thus, the Idle/Grant detection circuit 7 outputs signals representing the detected signals. The Data_Prefix detection circuit 8 detects Data_prefix signals from the signals given from the state machine. Thus, the Data_Prefix detection circuit 8 outputs signals representing the detected signals. The selector control circuit 9 controls signals to be transmitted to the state machine on the basis of the signals output from the Idle/Grant detection circuit 7 and the Data_Prefix signal detection circuit 8 respectively. The pseudo Idle signal creation circuit 10 creates pseudo Idle signals so that Idle signals are falsely output to the state machine. The selector 11 switches over outputs of the receiving decoder 6 and outputs of the pseudo Idle signal creation circuit 10 on the basis of an output of the selector control circuit 9. The collision signal creation circuit 12 creates collision signals due to collision between receive signals given from the selector 11 and send signals given from the state machine. The collision signals are output to the state machine.

Figure 2:
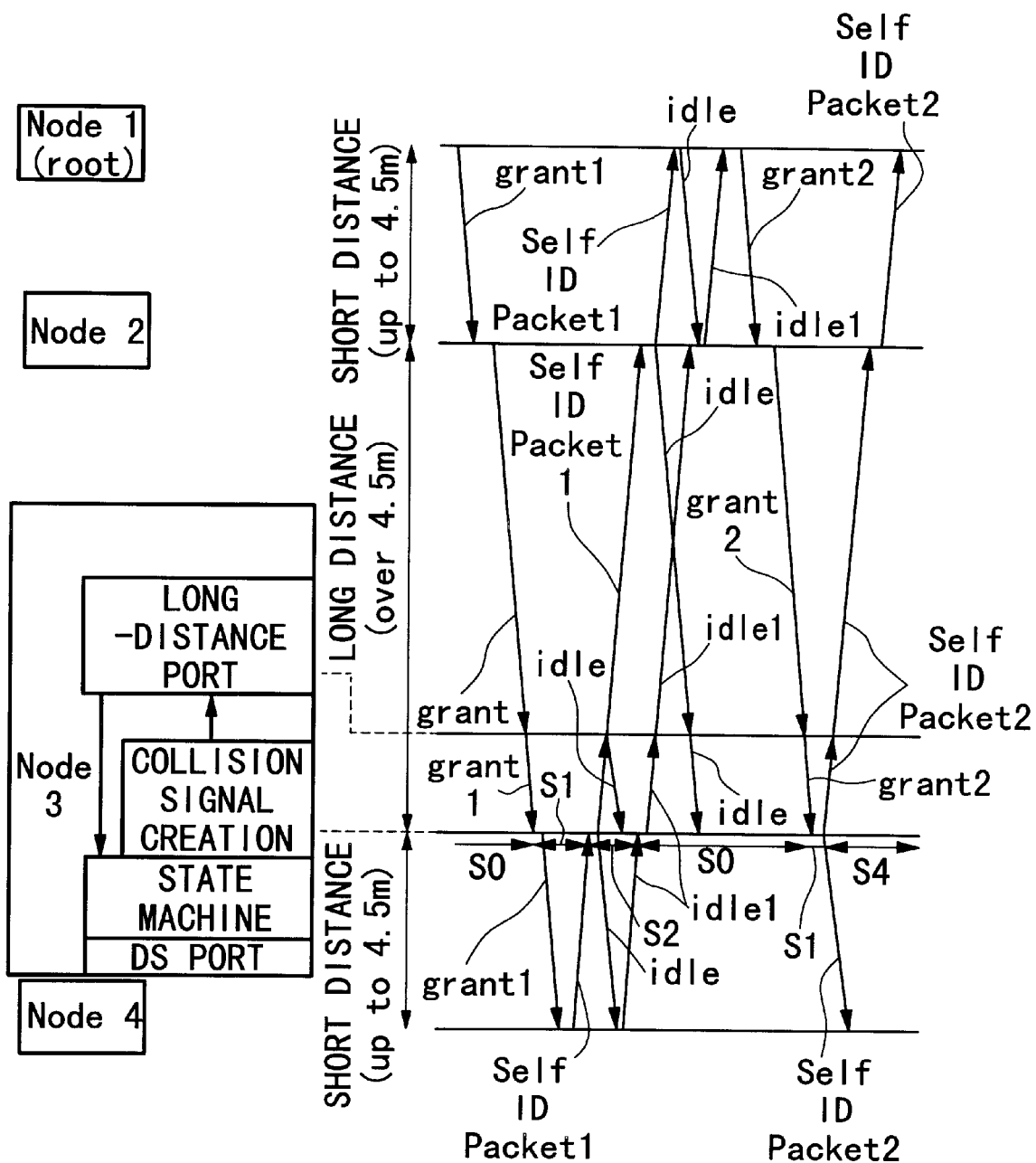
FIG. 2 is a schematic chart showing node-to-node communications performed by the serial-bus network containing nodes equipped with the signal sending-and-receiving circuit of FIG. 1.
Figure 11:
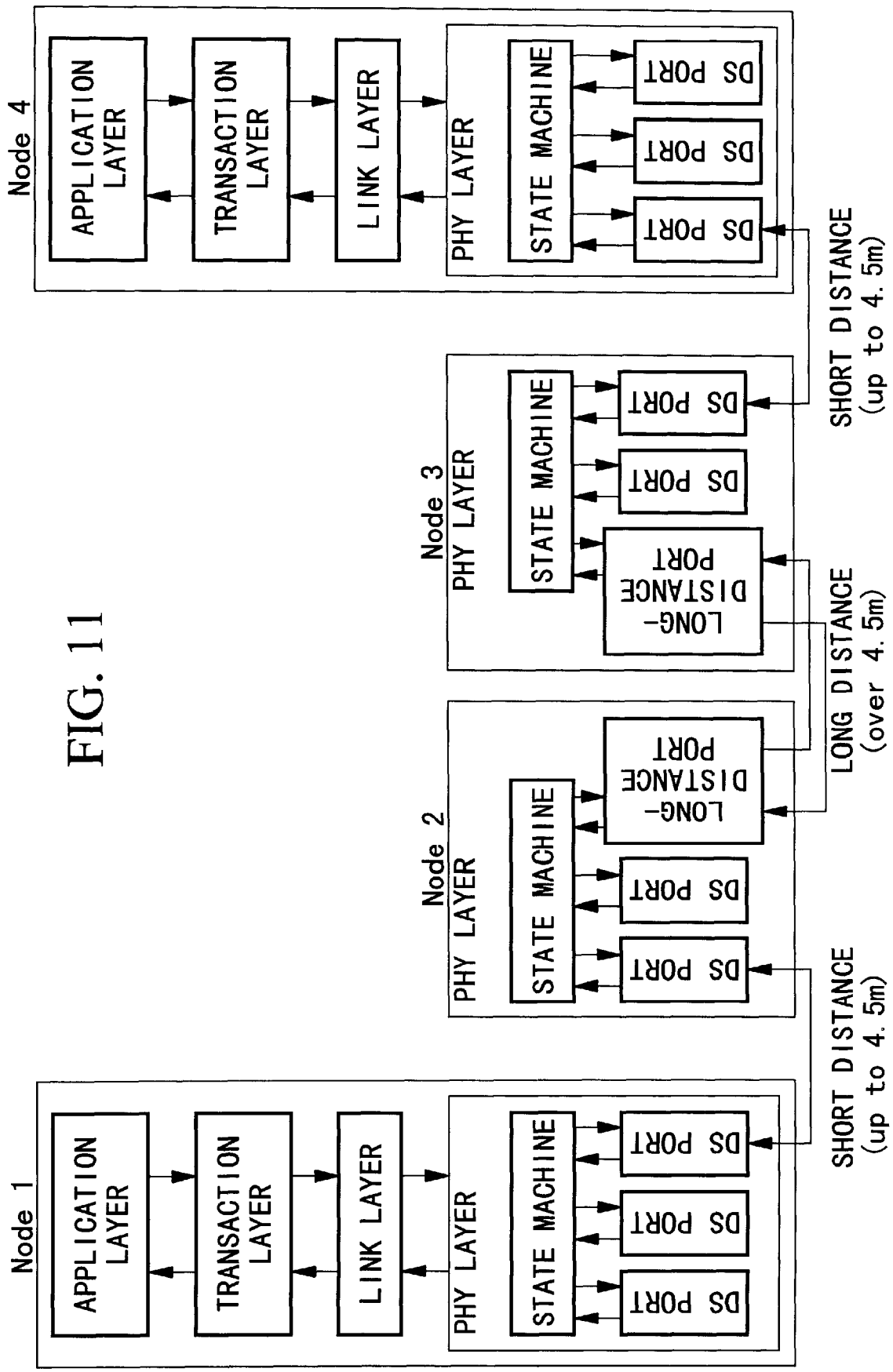
FIG. 11 is a block diagram showing an example of an architecture for a serial-bus network having nodes including long-distance ports used for long node-to-node distances.
Figure 12:
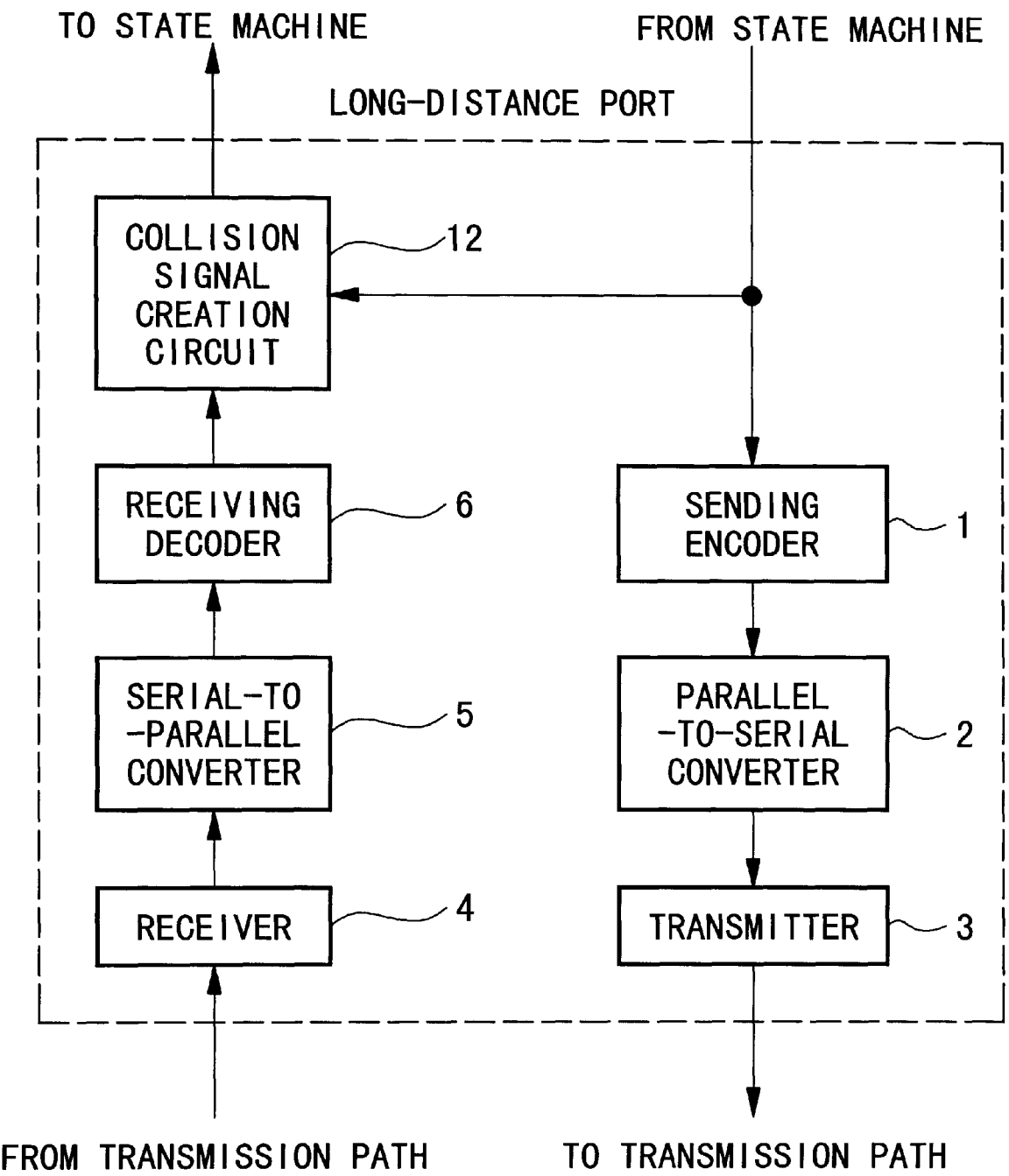
FIG. 12 is a block diagram showing an internal configuration of the long-distance port employed in some node of the serial-bus network of FIG. 11.
Figure 13:
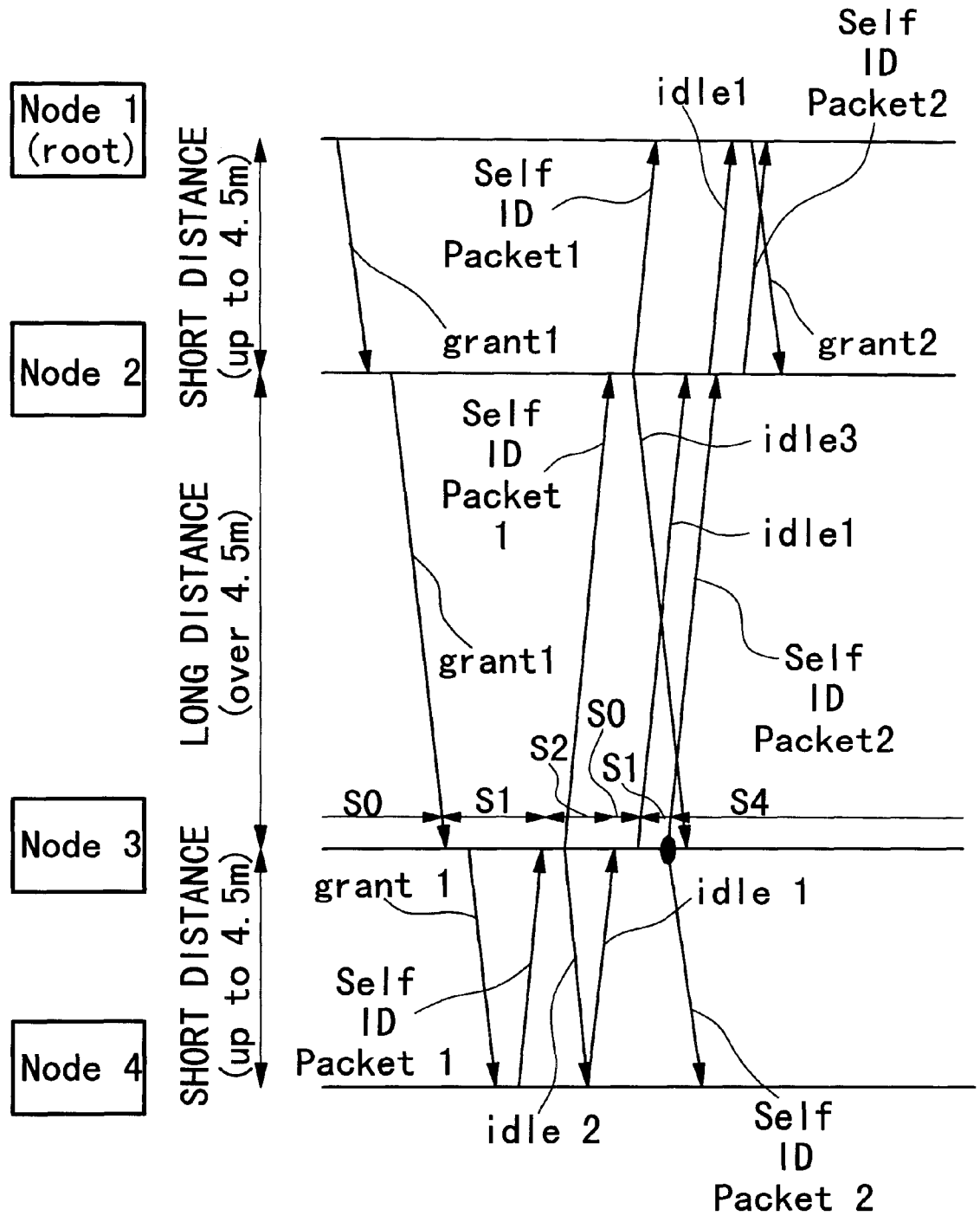
FIG. 13 is a schematic chart showing an example of the node-to-node communications in which a Self ID packet is damaged while being communicated between nodes of the serial-bus network whose node-to-node distance exceeds 4.5 m.

Next, a description will be given with respect to operations of the signal sending-and-receiving circuit of FIG. 1, which is provided for the aforementioned long-distance port applied to some of the nodes of the serial-bus network shown in FIG. 11, for example. FIG. 2 shows operations in node-to-node communications performed by the serial-bus network containing four nodes, i.e., Node 1, Node 2, Node 3 and Node 4 as shown in FIG. 11. For convenience sake, FIG. 2 shows Node 3 in such a way that (a part of) the signal sending-and-receiving circuit is provided separately from the state machine. In addition, Node 4 contains a signal sending-and-receiving circuit (i.e., DS port, not shown) which contains functions of the state machine thereof Further, Node 1 acts as a root (i.e., parent node) for other nodes in the aforementioned Tree ID process which determines parent-child relationships between the nodes prior to the Self ID process.

In the Self ID process, Node 1 firstly sends a grant signal (grant 1), which Node 2 repeats with respect to Node 3. Thus, Node 3 receives the grant 1 by a receiving section thereof In the receiving section of Node 3, the Idle/Grant detection circuit 7 detects the grant 1 so as to inform the selector control circuit 9 of detection of the grant 1. The selector control circuit 9 outputs a control signal to the selector 11. So, the selector 11 is controlled to selectively transfer an output of the receiving decoder 6 to the collision signal creation circuit 12. Thus, the state machine of Node 3 performs a state transition from S0 to S1. In addition, Node 3 repeats the grant 1 to Node 4. Upon receipt of the grant 1, Node 4 outputs a Self ID packet 1 following a Data_prefix signal representing a head portion of the packet to Node 3. Upon receipt of the Data_prefix signal from Node 4, Node 3 performs a state transition from S1 to S2, so that Node 3 repeats the Data_prefix signal to Node 2. At this time, the Data_Prefix detection circuit 8 of Node 3 detects the Data_prefix signal. In response to an output of the Data_Prefix detection circuit 8, the selector control circuit 9 outputs a control signal so that the selector 11 is controlled to selectively transfer an output of the pseudo Idle signal creation circuit 10 to the collision signal creation circuit 12. This blocks the grant 1 being given from Node 2. Node 3 repeats the Self ID packet 1 following the Data_prefix signal with respect to Node 2. Upon receipt of the Self ID packet 1 from Node 3, Node 2 stops repeating the grant 1 to Node 3 while outputting an Idle signal (Idle) to Node 3. Upon receipt of the Idle from Node 2, Node 3 detects the Idle by the Idle/Grant detection circuit 7 thereof Then, the Idle/Grant detection circuit 7 informs the selector control circuit 9 of detection of the Idle. Thus, the selector control circuit 9 outputs a control signal so that the selector 11 is controlled to selectively transfer an output of the receiving decoder 6 to the collision signal creation circuit 12. The long-distance port of Node 3 reverts control to the normal process. Thereafter, the serial-bus network employing the signal sending-and-receiving circuit of FIG. 1 operates similar to the aforementioned serial-bus network shown in FIG. 11. Therefore, Node 3 will send a Self ID packet 2 to other nodes in response to a grant signal (grant 2) given from the root (i.e., Node 1).

Figure 3:
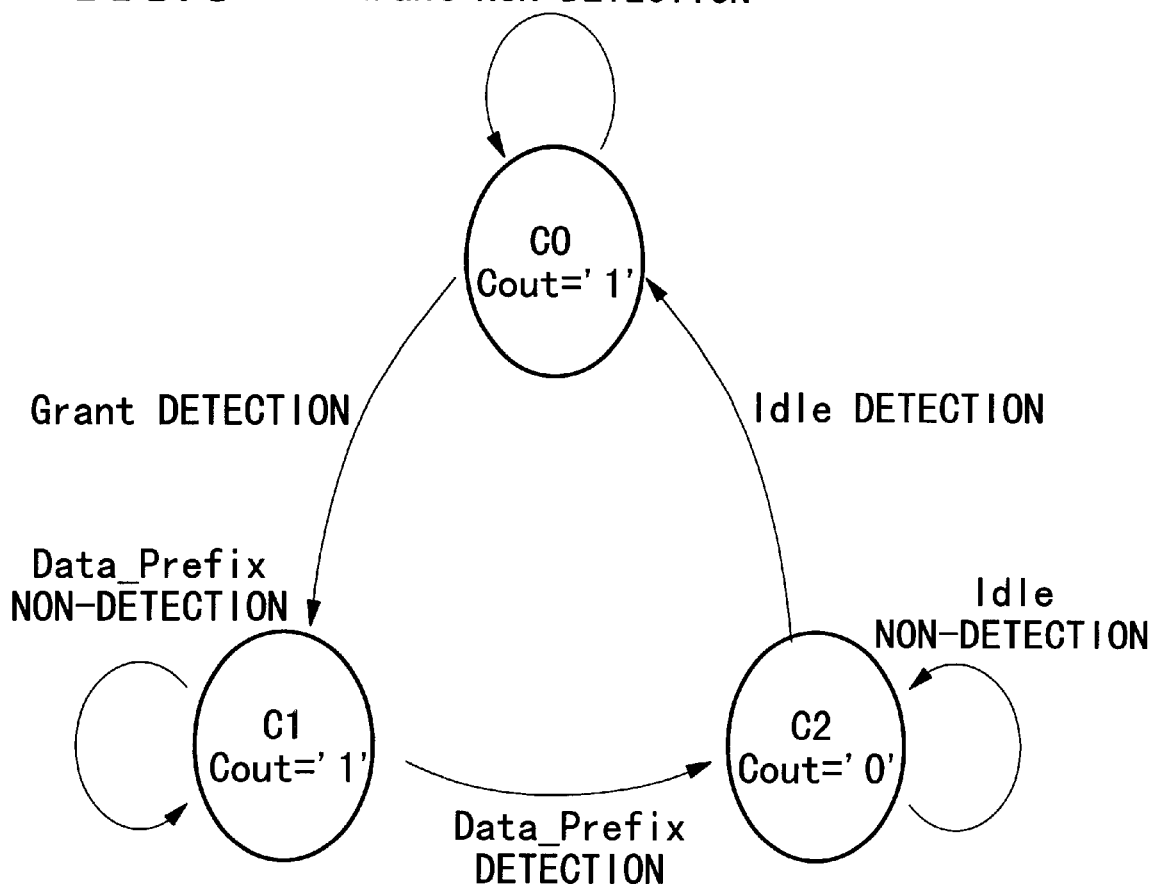
FIG. 3 is a state transition diagram showing transition of states in process of a selector control circuit shown in FIG. 1.
Figure 4:
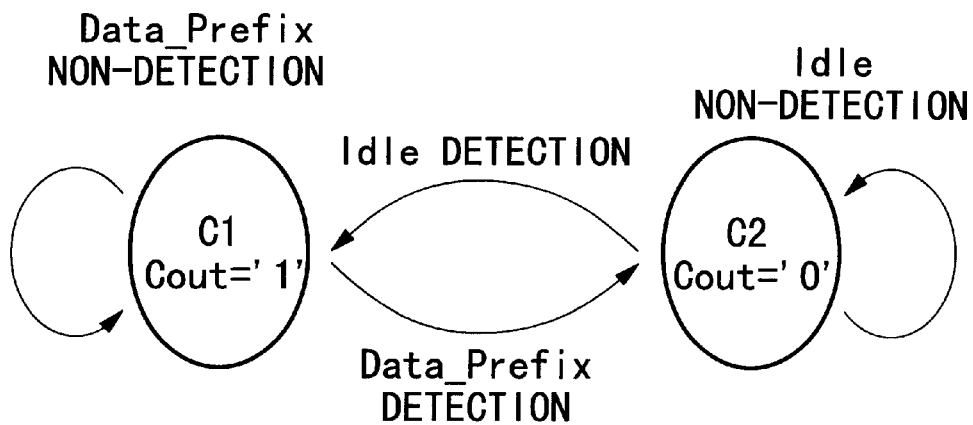
FIG. 4 is a state transition diagram which is an modification of the state transition diagram of FIG. 3.

FIG. 3 is a state transition diagram showing an overall process of the selector control circuit 9. The overall process of the selector control circuit 9 is configured by three states, namely, C0, C1 and C2. Herein, both of the states C0 and C1 provide an output represented by "Cout=1", while the state C2 provides an output represented by "Cout=0". Herein, each of the outputs of the states C0, C1 and C2 corresponds to the aforementioned control signal input to the selector 11. The selector 11 selects an output of the receiving decoder 6 when inputting the control signal of Cout=1, while the selector 11 selects an output of the pseudo Idle signal creation circuit 10 when inputting the control signal of Cout=0. A state transition from C0 to C1 occurs when the selector control circuit 9 senses detection of the grant signal (Grant). A state transition from C1 to C2 occurs when it senses detection of the Data_prefix signal. Further, a state transition from C2 to C0 occurs when it senses detection of the Idle signal. Incidentally, it is possible to modify the state transition process of FIG. 3 such that the detection of the grant signal is omitted as shown in FIG. 4.

Figure 5:
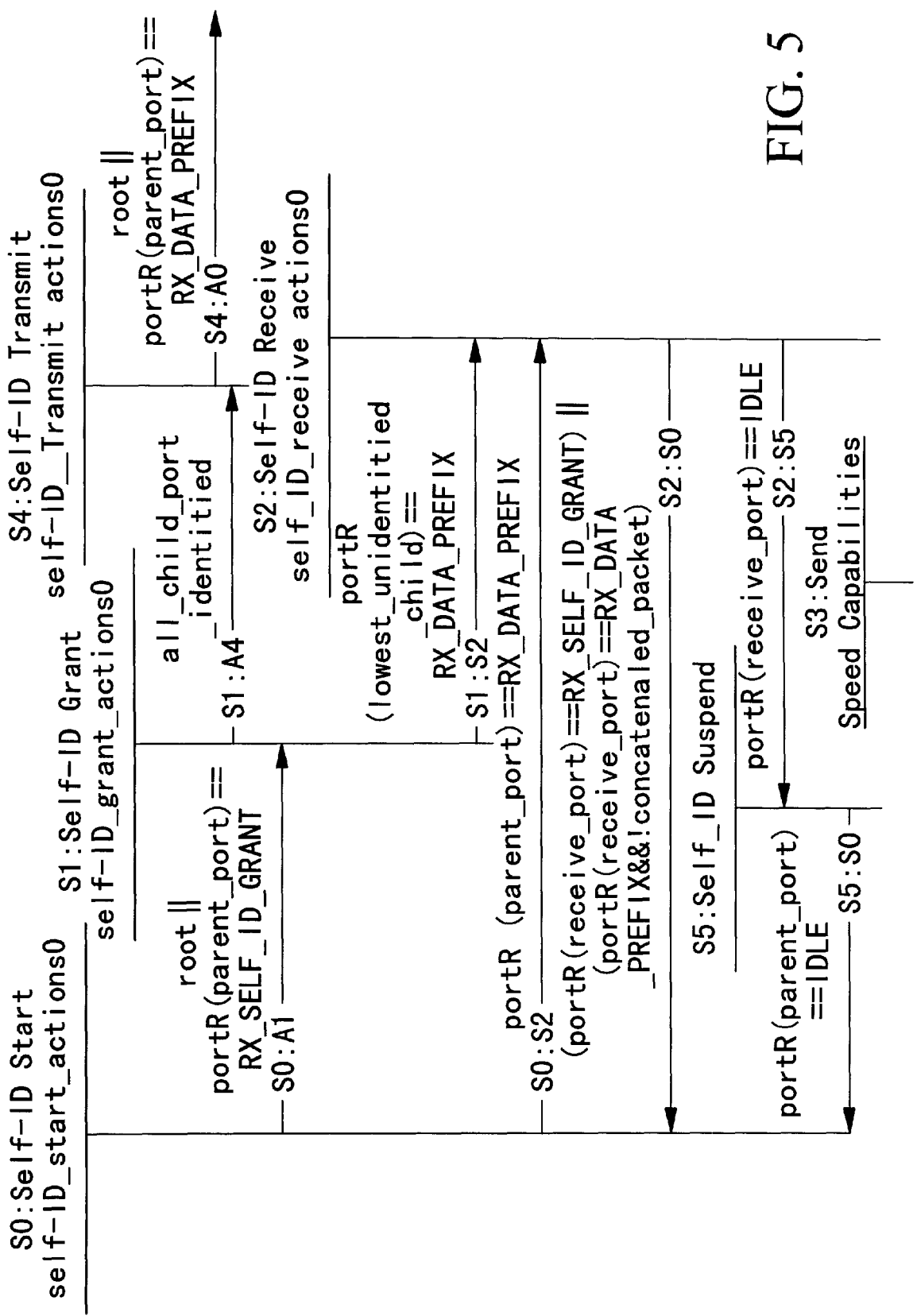
FIG. 5 is a state transition diagram showing states of a state machine to be installed into a node of the serial-bus network in accordance with the embodiment of the invention.

FIG. 5 shows procedures in state transition of the Self ID process, which is executed by the state machine used for the node of the serial-bus network.

As shown in FIG. 5, the state machine provides five states, namely, S0 (Self-ID Start), S1 (Self-ID Grant), S2 (Self-ID Receive), S3 (Send Speed Capabilities), S4 (Self-ID Transmit) and S5 (Self-ID Suspend).

The state S0 is an initial state of the Self ID process. Upon receipt of a grant signal, the state machine (of the root node) performs a state transition from S0 to S1. In the state S1, a grant signal is output to a port whose port number is the smallest within the ports connected to (child) nodes which do not complete the Self ID processes respectively. In addition, a Data_prefix signal is output to the other ports. When the port to which the grant signal is output receives the Data_prefix signal, a state transition occurs from S1 to S2. If all of the "connected" child nodes complete the Self ID processes respectively, a state transition occurs from S1 to S4. In the state S2, a Self ID packet is repeated with respect to ports other than a receive port. After completion of reception, a state transition occurs from S2 to S5. In the state S3, the state machine outputs "Speed Signal" representing the maximally allowable transmission speed. In the state S4, the state machine transmits the Self ID packet. When the port connected to a parent node detects the Data_prefix signal, a state transition occurs from S4 to A0 which corresponds to the Normal process. Incidentally, the state machine retains the state S5 for a while until the port connected to the parent node inputs Idle. When the port inputs Idle, a state transition occurs from S5 to S0.

Figure 6:
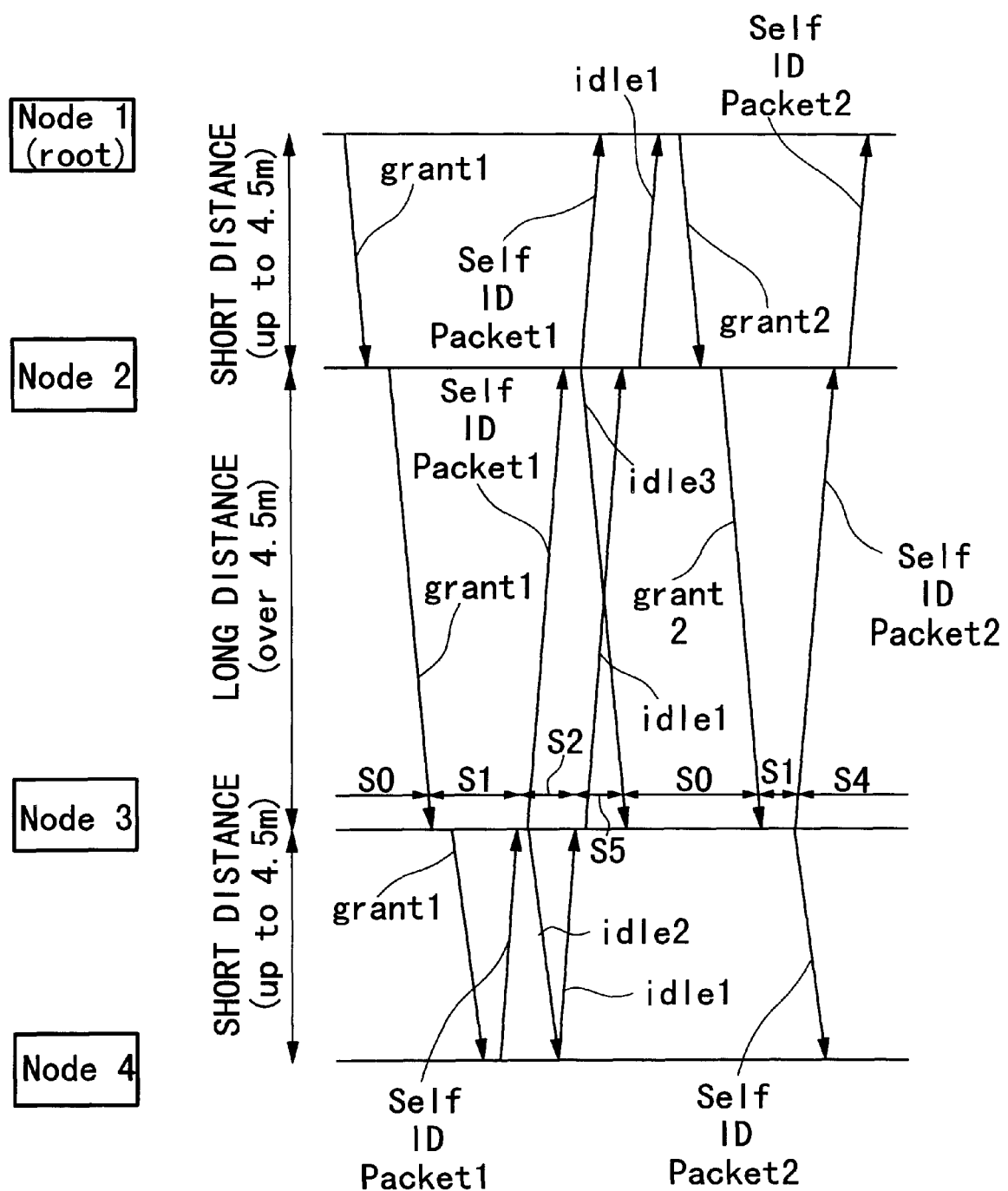
FIG. 6 is a schematic chart showing procedures in node-to-node communications effected using a node installing the state machine shown in FIG. 5.
Figure 7:
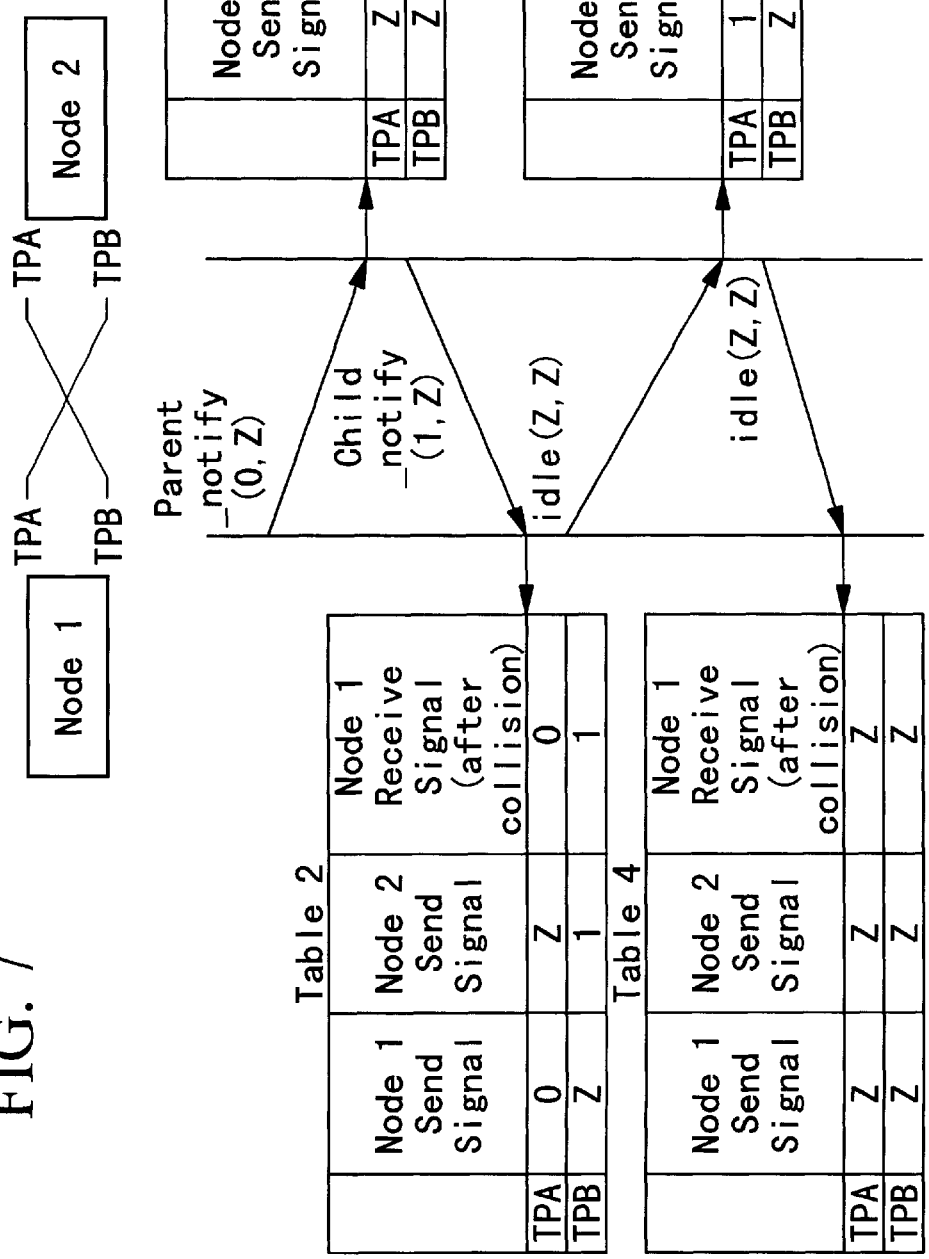
FIG. 7 is a schematic chart showing a manner of node-to-node communications effected between nodes by using twisted wire pairs.
Figure 8:
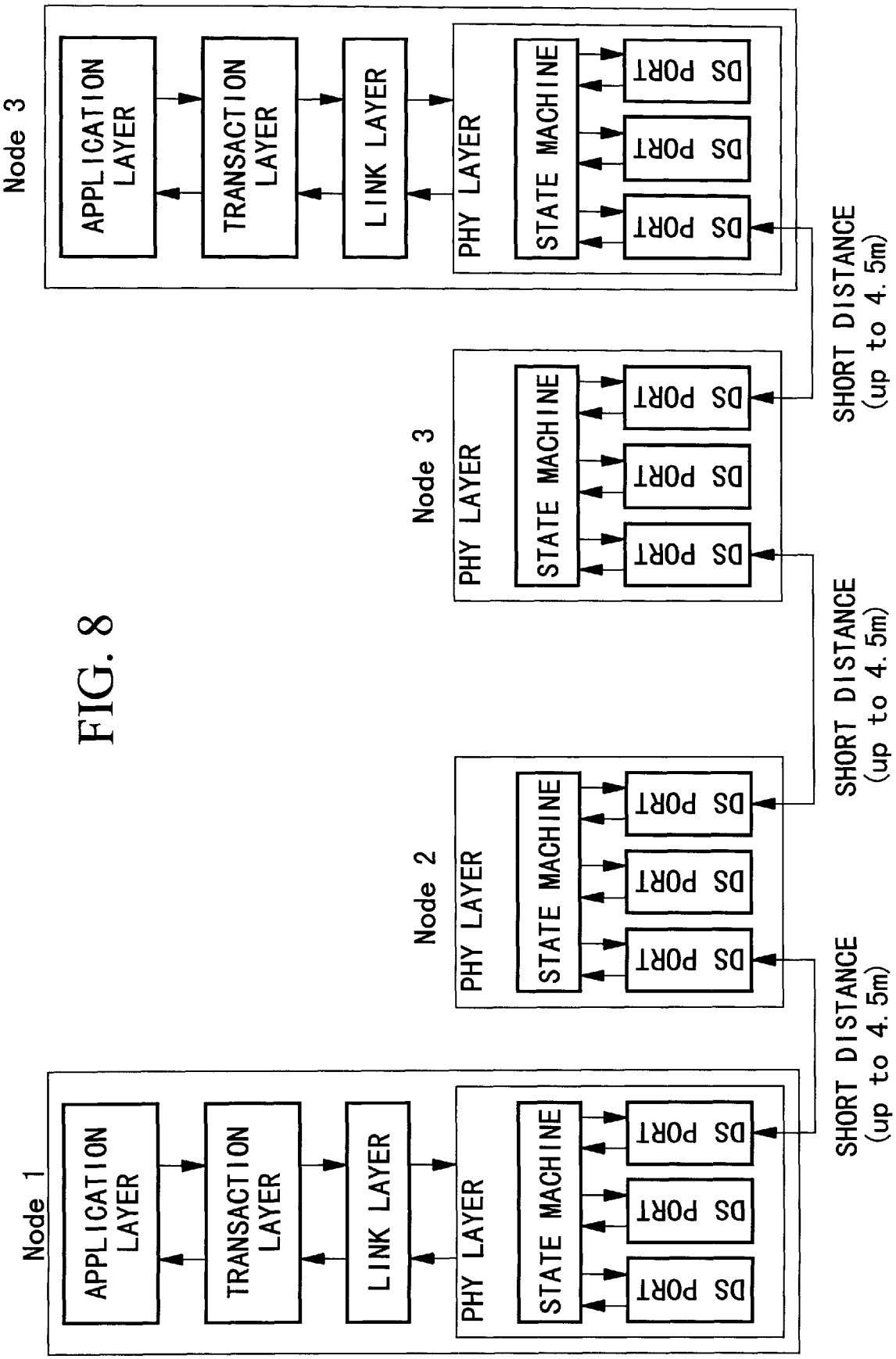
FIG. 8 is a block diagram showing an example of an architecture for a serial-bus network having nodes which are linked with each other by using twisted wire pairs.
Figure 9:
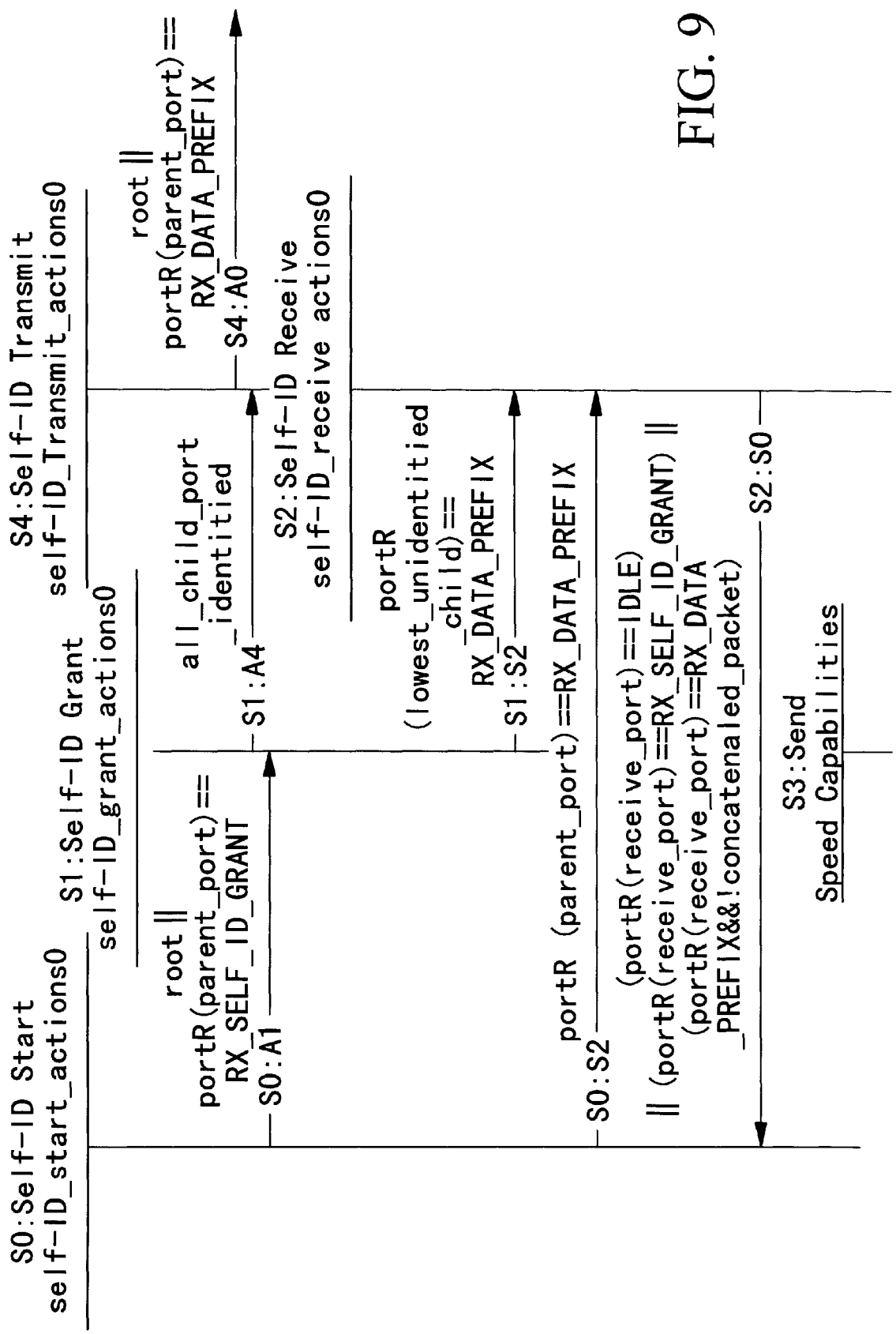
FIG. 9 is a state transition diagram showing states of a state machine in accordance with the conventional Self ID process.
Figure 10:
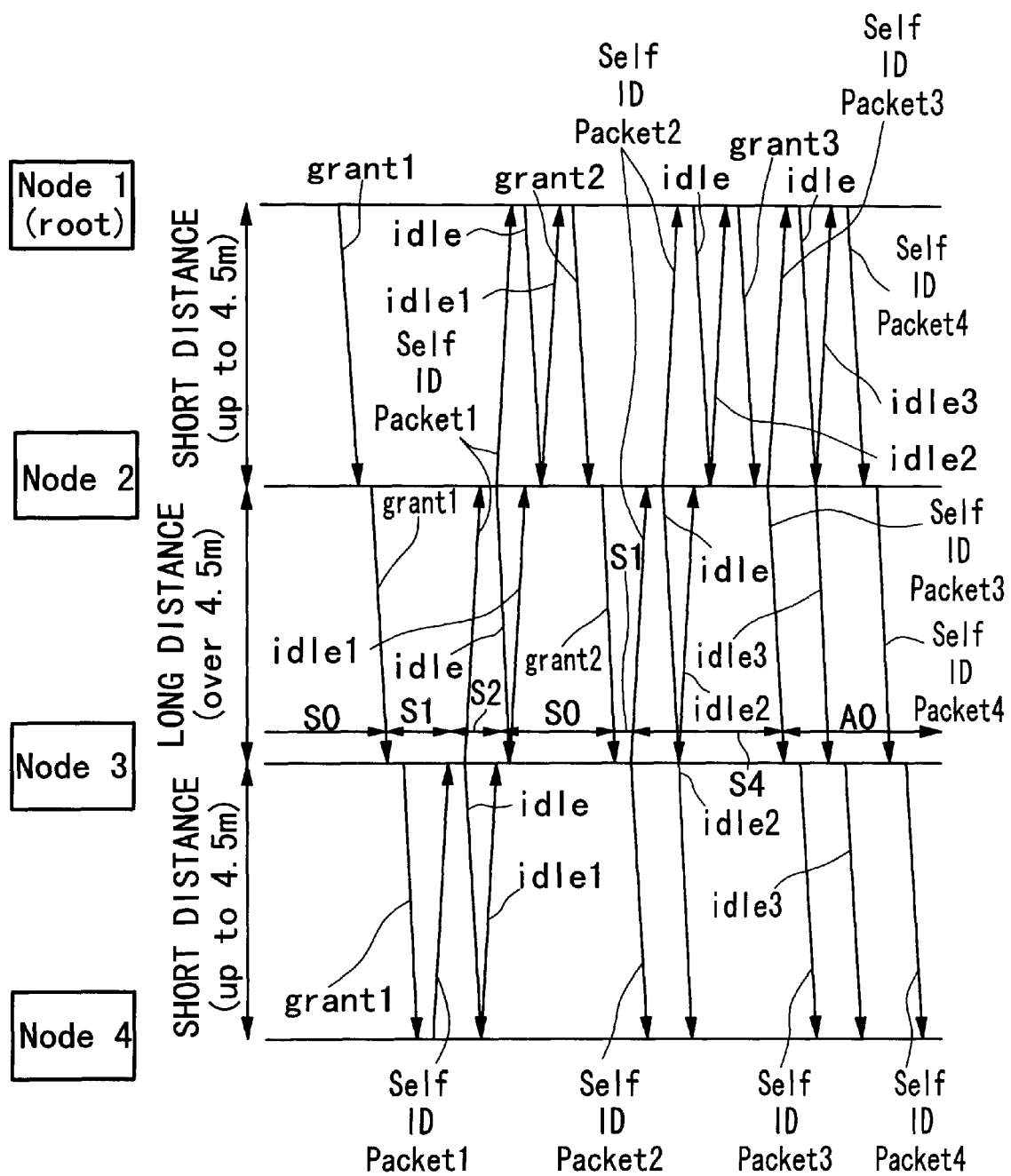
FIG. 10 is a schematic chart showing procedures in node-to-node communications in accordance with the Self ID process.

Next, a description will be given with respect to node-to-node communications effected by the nodes (Nodes 1–4) of the serial-bus network with reference to FIG. 6, wherein Node 3 installs the aforementioned state machine of FIG. 5. FIG. 6 shows procedures of the node-to-node communications as well as transition of the states of the state machine installed into Node 3.

Upon receipt of a grant signal (grant 1), Node 3 performs a state transition from S0 to S1. So, Node 3 sends the grant 1 to Node 4. Upon receipt of the grant 1, Node 4 receives a Self ID packet 1 following a Data_prefix signal representing a head portion of the packet. When receiving the Data_prefix signal corresponding to the head portion of the Self ID packet 1, Node 3 performs a state transition from S1 to S2, so that Node 3 is put into a state to receive the Self ID packet 1. After completion in reception of the Self ID packet 1, when the receive port of Node 3 receives an Idle signal, the state machine of Node 3 performs a state transition from S2 to S5. Then, Node 2 receives the Data_prefix signal corresponding to the head portion of the Self ID packet 1. Thus, Node 2 stops outputting the grant 1 so as to start sending an Idle signal (Idle 3) to Node 3. When receiving the Idle 3, Node 3 performs a state transition from S5 to S0. Thereafter, the state machine of Node 3 performs procedures similar to the foregoing procedures. Thus, Node 3 completes the Self ID process thereof.

As described heretofore, this invention has a variety of technical features and effects, which will be summarized as follows:

(1) Even if the node-to-node distance between the nodes of the serial-bus network exceeds 4.5 m, for example, it is possible to avoid false transmission in which the node in the Self ID process falsely transmits the Self ID packet to other nodes in response to the same grant signal. As a result, it is possible to prevent the Self ID packet from being damaged.

(2) A signal sending-and-receiving circuit of this invention, which contains a sending section and a receiving section, is applicable to a long-distance port used for the node installing the state machine in the serial-bus network. The signal sending-and-receiving circuit is characterized by providing the Data_Prefix detection, Idle/Grant detection and pseudo Idle creation as well as the selector which switches over the output of the receiving decoder and the pseudo Idle signal and which is controlled by the selector control circuit based on the detection of the Data_prefix and Idle or Grant. Herein, when the sending section detects the Data_prefix signal from the state machine, the Grant signal detected by the receiving section is converted to the pseudo Idle signal, which is transferred to the state machine. Using such pseudo Idle signal, the existing state machine, used for the node, is capable of avoiding false transmission of the Self ID packet even if it mistakenly recognizes the Grant signal. Thus, it is possible to perform the initialization of the serial-bus network normally.

(3) The Self ID process of this invention is characterized by providing the Self ID Suspend state (S5, see FIG. 5) for suspending the Self ID process in a state transition from the Self ID packet receive state (S2) to the initial state (S0). Herein, the state machine is designed to perform a state transition from a receiving state of receiving the Self ID packet to a state of "Self ID Suspend" in which the state machine is suspended until the port connected to the parent node inputs Idle. Thus, it is possible to prevent the state machine from responding to the false grant signal, so it is possible to perform initialization of the serial-bus network normally.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A signal sending-and-receiving circuit of a serial-bus device applicable to a plurality of nodes having parent-child relationships, wherein when receiving a Self ID packet from a child node after receiving a Grant signal from a parent node, said signal sending-and-receiving circuit blocks the Grant signal from being transmitted therefrom until receiving an Idle signal from the parent node.

2. A signal sending-and-receiving circuit of a serial-bus device applicable to a plurality of nodes having parent-child relationships, wherein when receiving a Self ID packet from a child node after receiving a Grant signal from a parent node, said signal sending-and-receiving circuit blocks the Grant signal from being transmitted therefrom by generating a pseudo Idle signal until receiving an Idle signal from the parent node.

3. A signal sending-and-receiving circuit of a serial-bus device applicable to a plurality of nodes having parent-child relationships, wherein when receiving a Self ID packet from a child node after receiving a Grant signal from a parent node, said signal sending-and-receiving circuit is placed in a stand-by state to block the Grant signal from being transmitted therefrom until receiving an Idle signal from the parent node.

4. A signal sending-and-receiving circuit of a serial-bus device applicable to a plurality of nodes having parent-child relationships, comprising:

transmission means for, when receiving a Self ID packet from a child node after receiving a Grant signal from a parent node, transmitting the Self ID packet to the parent node;

a Data_prefix detection circuit for detecting a Data_prefix signal representing a top of the Self ID packet transmitted by the transmission means; and pseudo Idle signal generation means for, when the Data_prefix signal detection circuit detects the Data_prefix signal, generating a pseudo Idle signal to block the Grant signal from being transmitted from the transmission means until receiving an Idle signal from the parent node.

5. A signal sending-and-receiving circuit of the serial-bus device according to claim 4, further comprising:

an Idle detection circuit for controlling the pseudo Idle signal generation means to stop generating the pseudo Idle signal when detecting reception of the Idle signal from the parent node.

6. A signal sending-and-receiving circuit of the serial-bus device according to claim 5, wherein the pseudo Idle signal generation means comprises:

an Idle signal generation circuit for generating an Idle signal, a selector for outputting either the Idle signal of the Idle signal generation circuit or the Idle signal given from the parent node, and a selector control circuit for controlling the selector to output the Idle signal of the Idle signal generation circuit in a duration between a timing when the Data_prefix detection circuit detects the Data_prefix signal and a timing when the Idle detection circuit detects the reception of the Idle signal from the parent node while controlling the selector to normally output the Idle signal of the parent node except during the duration.

7. A signal sending-and-receiving circuit of the serial-bus device according to claim 6, further comprising:

a serial-parallel conversion circuit for converting a serial signal given from another node to a parallel signal;

a decoding circuit for decoding the parallel signal, which is produced by the serial-parallel conversion circuit, to output a decoded signal to the selector;

a coding circuit for coding an output signal of the transmission means to produce a coded signal; and a parallel-serial conversion circuit for converting the coded signal being coded by the coding circuit to a serial signal.

8. A signal sending-and-receiving circuit of the serial-bus device according to claim 7, wherein the serial-bus device is based on IEEE 1394 standard.

9. A signal sending-and-receiving circuit of a serial-bus device applicable to a plurality of nodes having parent-child relationships, the signal sending-and-receiving circuit employing a method of a Self ID process comprising the steps of:

initiating a state transition to a Grant signal reception state when a node of the signal sending-and-receiving circuit receives a Grant signal from a parent node in an initial state;

initiating a state transition to a Self ID packet reception state when the node receives a Self ID packet from a child node in the Grant signal reception state;

initiating a state transition to an Idle wait state when the node completes receiving the Self ID packet in the Self ID packet reception state;

initiating a state transition to a Self ID packet transmission state if in the Grant signal reception state and all child nodes complete transmission of their respective Self ID packets; and initiating a state transition to the initial state when the node receives an Idle signal from the parent node in the Idle wait state.

10. A signal sending-and-receiving circuit of a serial-bus device applicable to a plurality of nodes having parent-child relationships, said signal sending-and-receiving circuit employing a method of a Self ID process comprising the steps of:

initiating a state transition to a state SI when a node of the signal sending-and-receiving circuit receives a Grant signal from a parent node in an initial state S0;

initiating a state transition to a state S2 when the node receives a Self ID packet from a child node in the state S1;

initiating a state transition to a state S5 when the node completes receiving the Self ID packet in the state S2;

initiating a state transition to a state S4 if in the state S1 and all child nodes completed transmitting their respective Self ID packets; and initiating a state transition to the initial state S0 when the node receives an Idle signal from the parent node in the state S5.

11. A signal sending-and-receiving circuit of the serial-bus device according to claim 10, wherein the serial-bus device is based on IEEE 1394 standard.

12. A control method of a signal sending-and-receiving circuit applicable to a plurality of nodes having parent-child relationships, comprising the steps of:

initiating a state transition to a Grant signal reception state when a node of the signal sending-and-receiving circuit receives a Grant signal from a parent node in an initial state;

initiating a state transition to a Self ID packet reception state when the node receives a Self ID packet from a child node in the Grant signal reception state;

initiating a state transition to an Idle wait state when the node completes receiving the Self ID packet in the Self ID packet reception state;

initiating a state transition to a Self ID packet transmission state if in the Grant signal reception state and all child nodes complete transmitting their respective Self ID packets; and initiating a state transition to the initial state when the node receives an Idle signal from the parent node in the Idle wait state.

13. A control method of a signal sending-and-receiving circuit applicable to a plurality of nodes having parent-child relationships, comprising the steps of:

initiating a state transition to a state S1 when a node of the signal sending-and-receiving circuit receives a Grant signal from a parent node in an initial state S0;

initiating a state transition to a state S2 when the node receives a Self ID packet from a child node in the state S1;

initiating a state transition to a state S5 when the node completes receiving the Self ID packet in the state S2;

initiating a state transition to a state S4 if in the state S1 and all child nodes complete transmitting their respective Self ID packets; and initiating a state transition to the initial state S0 when the node receives an Idle signal from the parent node in the state S5.

14. A control method of the signal sending-and-receiving circuit according to claim 13, wherein the control method corresponds to a Self ID process in which an ID is applied to each node connected by a serial-bus network based on IEEE 1394 standard.

* * * * *